United States Patent

[11] 3,578,107

[72] Inventors Wilhelm S. Everett;
James K. Floyd, Santa Paula, Calif.
[21] Appl. No. 807,715
[22] Filed Mar. 17, 1969
[45] Patented May 11, 1971
[73] Assignee Pulsation Controls Corporation
Santa Paula, Calif.

[54] PULSATION DAMPENER USING NON-LINEAR DECOUPLING MEANS
8 Claims, 6 Drawing Figs.

[52] U.S. Cl. .................................. 181/57, 181/68
[51] Int. Cl. ................................... F01n 1/08, F01n 7/02
[50] Field of Search ......................... 181/47, 57, 68—70, 63, 35.2, 33.9, 47.2, 56, 48, 59

[56] References Cited
UNITED STATES PATENTS
| | | | |
|---|---|---|---|
| 2,058,990 | 10/1936 | Johnson | 181/47 |
| 2,277,670 | 3/1942 | Weisgerber | 181/63UX |
| 2,548,472 | 4/1951 | Gibson | 181/47UX |
| 2,609,886 | 9/1952 | Harmon | 181/68X |
| 2,998,860 | 9/1961 | Everett | 181/56X |
| 3,114,430 | 12/1963 | Gallagher | 181/47X |

FOREIGN PATENTS
| | | | |
|---|---|---|---|
| 41,719 | 1/1933 | France | 181/68 |
| 350,666 | 7/1937 | Italy | 181/70 |

Primary Examiner—Robert S. Ward, Jr.
Attorney—Elliott and Pastoriza

ABSTRACT: A volume chamber having inlet and outlet nozzles adapted for connection in series in a pipe line between a source such as a compressor and a portion of a pipe normally connected to the source is provided for attenuating pressure pulsations in fluid passing through the line and resulting from action of the source such as a compressor. The inlet and outlet nozzles for the volume chamber incorporate nonlinear decoupling means to define partial obstructions to fluid flow into and out of the volume chamber. The acoustic compliance of the chamber and the resistances of the nonlinear decoupling means are so related to each other and to the density and flow rate of the fluid and the fluid displacement and resulting pulsation frequency by the source as to attenuate fluid pulsations in the line. A volume chamber with the inlet and outlet nozzles and nonlinear decoupling means may be incorporated in either the upstream or downstream side of the source or at both locations.

PATENTED MAY 11 1971
3,578,107

INVENTORS:
WILHELM S. EVERETT
JAMES K. FLOYD

BY *Elliott & Pastoriza,*
ATTORNEYS

PULSATION DAMPENER USING NON-LINEAR DECOUPLING MEANS

This invention relates generally to pulsation dampeners and more particularly to dampeners for use in fluid piping systems requiring relatively low attenuation of fluid pulsations in the system resulting from sources such as compressors, positive displacement flow meters, and the like.

BACKGROUND OF THE INVENTION

Many known types of pulsation dampeners utilizing a volume chamber and tubular elements within the chamber to provide a low band pass acoustic filter are often not economically feasible for very low attenuation requirements; for example, from zero to 70 percent of the pressure pulsation acting in the fluid piping system. Thus, the standard pi-filter, impedance tube, and three-tube type pulsation dampeners are based on low band pass acoustic theory and the nature of such low band pass filters causes difficulties in accurately sizing a pulsation dampener for very low attenuation requirements. This difficulty arises since the design point for low attenuation borders on a potential acoustic resonance (or amplification) in the low band pass frequency region.

Other types of pulsation dampeners including volume chambers and perforated tubes are difficult to describe accurately by acoustic theory. Accordingly, their performance in a given piping system cannot be easily predicted.

BRIEF DESCRIPTION OF THE PRESENT INVENTION

With the foregoing in mind, it is a primary object of the present invention to provide an economical pulsation dampener capable of meeting low attenuation requirements in fluid piping systems wherein the attenuation performance of the dampener can be predicted with reasonable accuracy and wherein further, standing waves are minimized and thus the risk of acoustic resonance and undesirable resulting amplification is minimized.

Towards the foregoing end, the invention achieves pulsation dampening without utilizing internal tubing elements in conjunction with a volume chamber or perforated tubular elements. Essentially the dampener of the invention comprises a volume chamber having inlet and outlet nozzles incorporating nonlinear flow resisting decouplers. The system may be incorporated in a fluid piping system such as a gas distribution system between a source such as a compressor and a portion of the pipe system normally connected to the source either on the upstream or downstream side of the source. In many instances, it is desirable to employ dampeners on both the up and downstream side of the source simultaneously.

The gas contained within the volume chamber of the invention reduces pressure pulsation by elastically absorbing a large portion of the gas "slug" displaced periodically by the compressor or other source. Accordingly, the resulting pressure pulsation propagated to the connecting piping system is decreased. The small frictional resistance offered to the flow of fluid by the nonlinear decoupling means provides additional attenuation of the pressure pulsation. The same nonlinear decouplers also minimize any acoustic resonance that could develop due to the acoustic interaction of the pulsation dampeners with the other piping system elements or with the source of pressure pulsation.

The flow resistance characteristics of the nonlinear decoupling means can readily b established by tests and emperical expressions readily derived for flow across the decoupling means in either direction. The attenuation performance of the pulsation dampener can accordingly be predicted with reasonable accuracy.

BRIEF DESCRIPTION OF THE DRAWINGS

A better understanding of the preferred embodiment of the invention will be had by referring to the accompanying drawings, in which.

Figure 1:
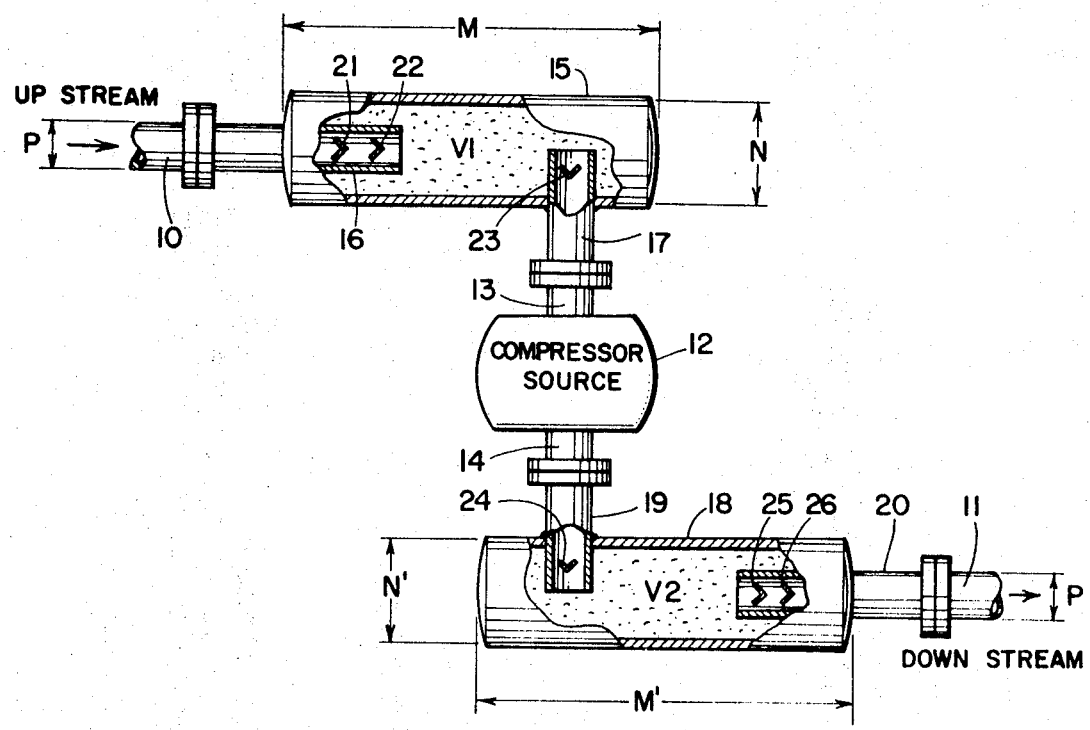
FIG. 1 is an elevation view partly broken away of pulsation dampeners in accord with the present invention utilized on the upstream and downstream side of a source such as a compressor in a fluid piping system.

Referring first to FIG. 1 there is shown at the upper left and lower right pipes 10 and 11 constituting part of a fluid piping system such as a gas distribution line. A source such as a compressor 12 having inlet and outlet connecting portions 13 and 14 normally connecting to the pipe portions 10 and 11, respectively is shown in the center of the drawing.

In accord with the invention, there is provided an upstream pulsation dampener in the form of a volume chamber 15 having inlet and outlet nozzles 16 and 17 arranged to be connected in series between the pipe portion 10 and inlet 13 of the compressor 12. Also illustrated is a second pulsation dampener for the downstream side of the compressor including a volume chamber 18 having inlet and outlet nozzles 19 and 20 connected in series between the outlet 14 for the compressor 12 and pipe portion 11.

The inlet nozzle for the first volume chamber 15 includes nonlinear decoupling means in the form of first and second axially spaced elements 21 and 22. The outlet nozzle for this first volume chamber also incorporates a nonlinear decoupling means in the form of an element 23.

In the downstream pulsation dampener, the inlet nozzle 19 incorporates a nonlinear decoupling means in the form of element 24 and the outlet nozzle 20 incorporates nonlinear decoupling means in the form of axially spaced elements 25 and 26.

It will be noted that the nozzle connections to the inlet and outlet of the compressor or other source incorporate only one element as a nonlinear decoupling resistance means whereas the nozzle connections to the fluid pipes 10 and 11 incorporate at least two nonlinear decoupling elements.

The various nonlinear decoupling means are characterized by offering a greater resistance to fluid flow in one direction than in the opposite direction and these means are so oriented as to exhibit greater resistance to the normal flow of fluid in the piping system.

Figure 2:
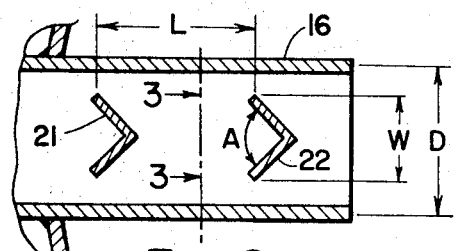
FIG. 2 is an enlarged fragmentary cross section of the inlet nozzle and nonlinear decoupling means in the upstream volume chamber dampener of FIG. 1.
Figure 3:
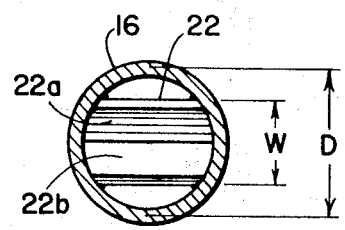
FIG. 3 is a cross section taken in the direction of the arrows 3–3 of FIG. 2.

Essentially, the various decoupling means offer partial obstructions to flow in the nozzles in which they are incorporated. The nonlinear characteristic (different resistance to flows in opposite directions) can be achieved by a variety of different configurations for the elements used. Essentially, a less streamlined configuration for one side of the element as compared to the other side should be provided. In this respect, if it is desired to provide a greater resistance to a given direction of fluid flow, the element should be provided with a concave front face and a convex back face. Such a configuration is essentially provided by a V-shaped plate element such as indicated in FIGS. 2 and 3. While the words concave and convex normally denote a surface of a specific type of curvature, the words as used herein are meant to cover any type of caved in or profile configuration offering a greater resistance to flow in one direction than the other.

In FIGS. 2 and 3, it will be evident that the decoupling elements each extend diametrically across the nozzle and have a width W as measured between the free ends of the V-shaped plate structure less than the nominal diameter D of the associated nozzle itself. The angle A between the plates may have a value, for example, of 90° merely as a fabricating convenience.

It is important in the design of the system of FIG. 1 that the decoupling means in the nozzles connected to the pipe portions of the system offer a greater resistance and thus a greater pressure drop than those decoupling means incorporated in the nozzles connected to the source or compressor. This increased pressure drop can readily be achieved by simply providing a greater number of decoupling plate elements in the nozzles connecting to the pipes than in the nozzles connecting to the compressor and in the particular embodiment shown, at least two such elements are axially spaced in the upstream inlet nozzle and downstream outlet nozzle 16 and 20 respectively. The axial spacing between the two decoupling means is denoted by L in FIG. 2 and normally should be sufficient to permit the interrupted fluid stream to come together again after passing the first decoupling element 21 and before striking the second decoupling element 22. It is found that the spacing L may be from 0.5 to 2.0 the nominal diameter to realize a desired result.

FIG. 3 illustrates clearly the front face of the element 22 made up of the plate arm portions 22a and 22b.

Figure 4:
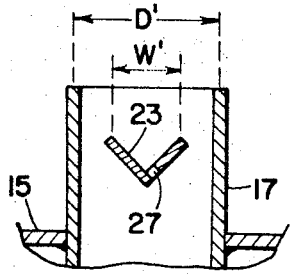
FIG. 4 is a fragmentary cross section of the outlet nozzle for the upstream dampener.
Figure 5:
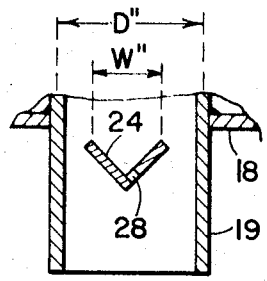
FIG. 5 is a fragmentary cross section of the inlet nozzle for the downstream dampener; and, FIG. 6 is a fragmentary cross section of the outlet nozzle for the downstream dampener of FIG. 1.
Figure 6:
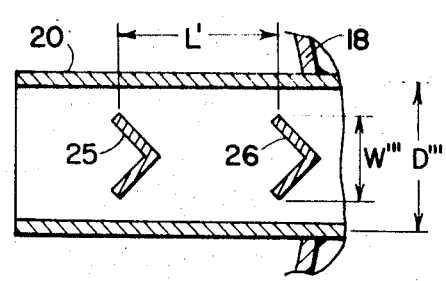

In the design of dampeners for use in both the upstream and downstream side of the source in a piping system, the actual nominal diameters of the nozzles and the volumes of the volume chambers as well as the dimensions of the decoupling elements are not necessarily the same. Thus the nominal diameters of the nozzles 17 and 19 in FIGS. 4 and 5 and the width of the corresponding decoupling elements are indicated by the letters $D'$ and $D''$ and $W'$ and $W''$ respectively whereas the nominal diameter and widths of the decoupling elements in the downstream outlet nozzle shown in FIG. 6 are designated $D'''$ and $W'''$ respectively.

The nonlinear single decoupling elements such as 23 and 24 in the nozzles connected to the compressor or source are designed to result in a pressure drop under steady state flow of the order of 0.15 percent of absolute line pressure or more broadly within the range of 0.05 percent to 0.30 percent. The dual decoupling elements in the nozzles 16 and 20 connected to the piping system are designed to provide a pressure drop under steady state flow conditions of about 0.85 percent of the line pressure or more broadly from 0.60 percent to 1 percent, this pressure drop, as noted, being greater than that resulting from the use of a single decoupling element.

The volumes $V1$ and $V2$ of the first and second chambers 15 and 18 in FIG. 1 are sufficient to provide a desired acoustic compliance and in every instance are defined by dimensions between interior walls greater than the diameter of the pipeline in which they are incorporated.

In the design of the dampeners for a compressor system or other source of pulsating fluid flow there must first be established the following: (1) the attenuation required, (2) the effective acoustical compliance of the compressor itself, and (3) the surge impedance which describes the effective acoustical impedance of the connecting piping. This latter assumes that the piping produces no acoustical reflections which can influence the pulsation environment at the compressor or other source.

Once the above acoustic characteristics of the compressor and piping system have been established, the sizing and design of the pulsation dampeners of the invention are accomplished by relating the acoustical properties of the dampeners to those of the system as follows: the allowable pressure loss through the pulsation dampener is built into the nonlinear decoupling elements for the design steady-state flow conditions. Next, the acoustic compliance of the respective pulsation dampener volume chambers is selected so that it, in conjunction with the resistance provided by the decouplers, produces the desired attenuation. Thus, the acoustic compliances of the first and second volume chambers and the resistances of the nonlinear decoupling means are so related to each other and to the density and flow rate of the fluid and the fluid displacement and resulting pulsation frequency by the compressor or other source as to attenuate fluid pulsations in the line in the desired manner.

As a typical example, in a practical application of the pulsation dampeners of FIG. 1 in a gas piping system incorporating a compressor, assume the compressor is double acting with a 1.85 cubic foot displacement and is operating at a speed such that pressure pulsations occur at a fundamental frequency of about 10 per second. Additionally, assume that the fluid constitutes a hydrocarbon gas of about 0.37 specific gravity.

Under the foregoing circumstances, the desired low attenuation of the generated pulsations or surges by the compressor is readily accomplished if the nozzles, nonlinear decouplers, and volume chambers are sized as follows:

| Upstream side | Downstream side |
| --- | --- |
| $V1$=28.5 cubic feet ($N$=24''; $M$=120'') | $V2$=27.2 cubic feet. |
| $D$=7.63 inches | $D''$=9.56 inches. |
| $W$=4.19 inches (for each element) | $W''$=6.81 inches. |
| $L$=8 inches | $D'''$=5.50 inches. |
| $D'$=9.56 inches | $W'''$=3.19 inches (for each element). |
| $W'$=5.06 inches | $L'$=6 inches. |

With the foregoing dimensioning, an attenuation of about 60 percent was realized.

OPERATION

The operation of the pulsation dampener will be evident from the foregoing description.

As mentioned heretofore, a properly designed volume chamber with inlet and outlet nozzles incorporating suitable nonlinear resistance decouplers can be incorporated in either the upstream or downstream side of the source in the piping system or at both locations as illustrated in the particular example of FIG. 1. The gas contained within the volume chambers reduces the pressure pulsations by elastically absorbing large portions of the gas "slugs" displaced periodically by the compressor or other source. The resulting pressure pulsation propagating to the connecting piping system is therefore decreased. The small friction offered to the flow stream by the nonlinear decouplers provides additional attenuation of the pressure pulsations. As mentioned also heretofore, these nonlinear decouplers minimize any acoustic resonance that might develop due to acoustic interaction of the pulsation dampener with other piping system elements.

The entire dampener is easily and predictably designed for those instances in which only low attenuation is required and the problems encountered with standard pi-type filters, impedance tubes and three-tube type pulsation dampeners are avoided. The structure is simple and rugged and can be economically manufactured.

From the foregoing, it will be evident that the present invention has provided an improved pulsation dampener particularly well suited for low attenuation requirements in gas systems. While the designs discussed herein are primarily for gas piping systems, it should be understood that the principles are applicable to other fluid systems such as liquid flow piping systems.

The invention accordingly, is not to be thought of as limited to the particular embodiment set forth merely for illustrative purposes.

I claim:

1. A pulsation dampener for attenuating fluid pressure pulsations in a pipeline resulting from a source connected in said line, comprising, in combination:
    a. a volume chamber having inlet and outlet nozzles adapted for connection in series in said pipeline between said source and a portion of pipe normally connected to said source; and
    b. nonlinear decoupling means disposed in said nozzles to define partial obstructions to fluid flow into and out of said volume chamber, the acoustic compliance of said chamber and the resistances of said nonlinear decoupling means being so related to each other and to the density and flow rate of said fluid and the fluid displacement and resulting pulsation frequency by said source as to attenuate fluid pulsations in said line.

2. The subject matter of claim 1, in which the pressure drop caused by the nonlinear decoupling means in the nozzle adapted to be connected to said portion of pipe is greater than the pressure drop caused by the nonlinear decoupling means in the nozzle adapted to be connected to said source.

3. The subject matter of claim 2, in which said nonlinear decoupling means each comprise at least one plate element extending diametrically across its associated nozzle and having a front face of concave configuration intercepting normal fluid flow, the width of said element as measured transverse to its diametric extent across its associated nozzle being from 0.2 to 0.8 the nominal diameter of said associated nozzle to define said partial obstructions.

4. A pulsation dampener for attenuating fluid pressure pulsations in a piping system line resulting from a source connected in said line, comprising, in combination:
  a. a chamber defining a closed interior volume of dimensions between interior walls greater than the diameter of said piping system line;
  b. a chamber inlet nozzle connected to and communicating with the interior of said chamber;
  c. a chamber outlet nozzle connected to and communicating with the interior of said chamber, said chamber inlet nozzle and said chamber outlet nozzle being adapted for connection is said piping system between said source and a portion of pipe normally connected to said source;
  d. first nonlinear decoupling means defining a partial obstruction in said chamber inlet nozzle characterized by offering a greater resistance to fluid flow passing into said nozzle to fill said chamber than to fluid flow in the opposite direction; and
  e. second nonlinear decoupling means defining a partial obstruction in said chamber outlet nozzle characterized by offering a greater resistance to fluid flow passing out of said nozzle from said chamber than to fluid flow in the opposite direction, the acoustic compliance of said chamber and the resistance of said first and second nonlinear decoupling means being so related to each other and to the density and flow rate of said fluid and the fluid displacement and resulting pulsation frequency by said source as to attenuate fluid pulsations in said line.

5. The subject matter of claim 4, in which said chamber inlet nozzle is connected to an upstream portion of said line and said chamber outlet nozzle is connected to the fluid inlet of said source, said first nonlinear decoupling means including at least two elements spaced along the longitudinal axis of said nozzle at a given distance from each other and said second nonlinear decoupling means including a lesser number of elements on its axis such that the pressure drop across said inlet nozzle is greater than the pressure drop across said outlet nozzle.

6. The subject matter of claim 4, in which said chamber inlet nozzle is connected to the fluid outlet of said source and said chamber outlet nozzle is connected to a downstream portion of said line, said first nonlinear decoupling means including at least one element on its axis and said second nonlinear decoupling means including a greater number of elements spaced along the longitudinal axis of said nozzle at a given distance from each other such that the pressure drop across said inlet nozzle is less than the pressure drop across said outlet nozzle.

7. A pulsation dampener for attenuating fluid pressure pulsations in a piping system line resulting from a source connected in said line, comprising, in combination:
  a. a first chamber defining a closed interior volume of dimensions between interior walls greater than the diameter of said piping system line;
  b. a first chamber inlet and outlet nozzles communicating with said interior and an upstream portion of said line and the fluid inlet to said source, respectively;
  c. a second chamber defining a closed interior volume of dimensions between interior walls greater than the diameter of said piping system line;
  d. second chamber inlet and outlet nozzles communicating with said interior and the fluid outlet from said source and a downstream portion of said line, respectively; and
  e. nonlinear decoupling means defining partial obstructions in each said first chamber inlet and outlet nozzles and said second chamber inlet and outlet nozzles characterized by offering a greater resistance to fluid flow passing from upstream to downstream than to fluid flow in the opposite direction, the nonlinear decoupling means in said first chamber inlet nozzle and said second chamber outlet nozzle providing a greater pressure drop thereacross than the nonlinear decoupling means in said first chamber outlet nozzle and said second chamber inlet nozzle, the acoustic compliances of said first and second chambers and the resistances of said nonlinear decoupling means being so related to each other and to the density and flow rate of said fluid and the fluid displacement and resulting pulsation frequency by said source as to attenuate fluid pulsations in said line.

8. The subject matter of claim 7, in which said nonlinear decoupling means each include at least one plate element extending diametrically across its associated nozzle and having a front face of concave configuration intercepting normal fluid flow, the width of said element as measured transverse to its diametric extent across its associated nozzle being from 0.2 to 0.8 the nominal diameter of said associated nozzle to define said partial obstructions, the nonlinear decoupling means in said first chamber outlet nozzle and said second chamber inlet nozzle each comprising a single element to cause a pressure drop of from 0.5 percent to 0.30 percent of absolute line pressure under steady state flow conditions, the nonlinear decoupling means in said first chamber inlet nozzle and said second chamber outlet nozzle each comprising two elements at an axial spacing of from 0.5 to 2.0 said nominal diameter to cause a pressure drop of from 0.60 percent to 1.0 percent to define said greater pressure drop.

UNITED STATES PATENT OFFICE
CERTIFICATE OF CORRECTION

Patent No. 3,578,107          Dated May 11, 1971

Inventor(s) Wilhelm S. Everett et al.

It is certified that error appears in the above-identified patent and that said Letters Patent are hereby corrected as shown below:

Column 1, line 66, "b" should read -- be --. Column 5, line 31, "is" should read -- in --. Column 6, line 51, "0.5" should read -- .05 --.

Signed and sealed this 30th day of November 1971.

(SEAL)
Attest:

EDWARD M. FLETCHER, JR.　　　　　ROBERT GOTTSCHALK
Attesting Officer　　　　　　　　Acting Commissioner of Patents